(12) United States Patent
Miyazaki et al.

(10) Patent No.: US 9,180,873 B2
(45) Date of Patent: Nov. 10, 2015

(54) CONTROL DEVICE OF HYBRID VEHICLE

(75) Inventors: Terufumi Miyazaki, Toyota (JP);
Yukihiko Ideshio, Nisshin (JP);
Toshihiko Kamiya, Toyota (JP); Shingo Eto, Gamagori (JP); Hironori Asaoka, Nisshin (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 158 days.

(21) Appl. No.: 14/000,694

(22) PCT Filed: Feb. 23, 2011

(86) PCT No.: PCT/JP2011/053967
§ 371 (c)(1),
(2), (4) Date: Aug. 21, 2013

(87) PCT Pub. No.: WO2012/114472
PCT Pub. Date: Aug. 30, 2012

(65) Prior Publication Data
US 2013/0331228 A1    Dec. 12, 2013

(51) Int. Cl.
*B60W 10/02* (2006.01)
*B60W 20/00* (2006.01)
*B60W 10/06* (2006.01)
*B60K 6/48* (2007.10)

(52) U.S. Cl.
CPC ............... *B60W 20/40* (2013.01); *B60K 6/48* (2013.01); *B60W 10/026* (2013.01); *B60W 10/06* (2013.01); *B60W 20/00* (2013.01); *B60K 2006/4816* (2013.01); *B60W 2510/0233* (2013.01); *Y02T 10/48* (2013.01); *Y02T 10/6221* (2013.01); *Y02T 10/6256* (2013.01); *Y10S 903/902* (2013.01); *Y10T 477/26* (2015.01)

(58) Field of Classification Search
CPC ...... B60W 20/40; B60W 10/06; B60W 20/00; B60W 10/026; B60W 2510/0233; B60K 6/48; B60K 2006/4816; B60K 6/00; B60K 6/26
USPC .......................................................... 477/5
See application file for complete search history.

(56) References Cited

U.S. PATENT DOCUMENTS 8,167,771 B2 * 5/2012 Roses et al. ................. 477/5
2007/0056783 A1 3/2007 Joe et al.
(Continued)

FOREIGN PATENT DOCUMENTS

JP 2004-60861 2/2004
JP 2004-150334 5/2004
(Continued)

*Primary Examiner* — David J Hlavka
(74) *Attorney, Agent, or Firm* — Finnegan, Henderson, Farabow, Garrett & Dunner, LLP (57) ABSTRACT

It is provided a control device of a hybrid vehicle having an engine, an electric motor, a clutch disposed in a power transmission path between the engine and the electric motor, and a hydraulic power transmission device with a lockup clutch disposed in a power transmission path between the electric motor and drive wheels, the control device being configured to engage the clutch and provide slip control of the lockup clutch when the engine is started from motor running using the electric motor, and to lower an engagement pressure of the lockup clutch as compared to the case of an engine start caused by an acceleration request from a driver if the start of the engine is an engine start caused by a request from a hybrid system.

4 Claims, 5 Drawing Sheets

(56) References Cited

U.S. PATENT DOCUMENTS

| | | | |
|---|---|---|---|
| 2007/0246273 A1* | 10/2007 | Tenbrock et al. | 180/65.2 |
| 2007/0246274 A1* | 10/2007 | Dreibholz et al. | 180/65.2 |
| 2007/0246275 A1* | 10/2007 | Dreibholz et al. | 180/65.2 |
| 2010/0125019 A1 | 5/2010 | Tabata et al. | |
| 2010/0250037 A1* | 9/2010 | Yoshida et al. | 701/22 |
| 2010/0273606 A1* | 10/2010 | Roses et al. | 477/62 |
| 2011/0240430 A1* | 10/2011 | Iwase et al. | 192/3.29 |
| 2011/0240431 A1* | 10/2011 | Iwase et al. | 192/3.29 |
| 2012/0316028 A1* | 12/2012 | Kobayashi et al. | 477/5 |

FOREIGN PATENT DOCUMENTS

| | | |
|---|---|---|
| JP | 2005-114173 | 4/2005 |
| JP | 2007-69789 | 3/2007 |
| JP | 2007-326557 | 12/2007 |
| JP | 2010-149640 | 7/2010 |
| JP | 2010-149748 | 7/2010 |
| WO | WO 2008/132893 A1 | 11/2008 |

* cited by examiner

| SHIFT STAGE | GEAR RATIO | GEAR STATE |
|---|---|---|
| 1st | $\gamma 1$ | Low GEAR |
| 2nd | $\gamma 2$ | Low GEAR |
| 3rd | $\gamma 3$ | Hi GEAR |
| ... | ... | Hi GEAR |
| Nth | $\gamma N$ | Hi GEAR |

| SHIFT STAGE | GEAR RATIO | ENGAGEMENT PRESSURE |
|---|---|---|
| 1st | $\gamma 1$ | $\Delta P1$ |
| 2nd | $\gamma 2$ | $\Delta P2$ |
| 3rd | $\gamma 3$ | $\Delta P3$ |
| ... | ... | ... |
| Nth | $\gamma N$ | $\Delta PN$ |

FIG.10

CONTROL DEVICE OF HYBRID VEHICLE

CROSS-REFERENCE TO RELATED APPLICATIONS

This application is a national phase application of International Application No. PCT/JP2011/053967, filed Feb. 23, 2011, the content of which is incorporated herein by reference.

TECHNICAL FIELD

The present invention relates to a control device of a hybrid vehicle and particularly to shock reduction at the time of engine start.

BACKGROUND ART

A hybrid vehicle is known that includes an engine, an electric motor, a clutch disposed in a power transmission path between the engine and the electric motor, and a hydraulic power transmission device with a lockup clutch disposed between the electric motor and drive wheels. For example, a parallel hybrid power train 1 (power transmission device) of Patent Document 1 is an example thereof.

Patent Document 1 describes that when the engine is started from motor running using the electric motor, a shock due to torque variation generated at the time of engine start is suppressed by slip operation of the lockup clutch.

PRIOR ART DOCUMENTS

Patent Documents

Patent Document 1: Japanese Laid-Open Patent Publication No. 2007-326557
Patent Document 2: Japanese Laid-Open Patent Publication No. 2010-149640

SUMMARY OF THE INVENTION

Problem to Be Solved by the Invention

In the power train 1 of Patent Document 1, a slip rotation number of the lockup clutch at the time of engine start is set based on characteristics of a torque converter. A target rotation speed of the electric motor is determined from a turbine rotation speed of the torque converter and the slip rotation number. The power train 1 configured as described above cannot support shock reduction corresponding to the presence of depression of an accelerator pedal. For example, when a remaining battery level becomes low, the engine start is initiated by a request from a hybrid system for performing electric generation with the engine even if the accelerator pedal is not depressed. In such a case, the engine start is not intended by a driver and, therefore, the driver becomes more sensitive to shock due to the engine start. However, since the slip rotation number is set in the power train 1 depending on the characteristics of the torque converter regardless of whether the accelerator pedal is depressed, the driver may feel the shock.

The present invention was conceived in view of the situations and it is therefore an object of the present invention to provide a control device of a hybrid vehicle capable of reducing shock to a driver when an engine is started from motor running using an electric motor in the hybrid vehicle.

Means for Solving the Problem

To achieve the object, the first aspect of the invention provides (a) a control device of a hybrid vehicle having an engine, an electric motor, a clutch disposed in a power transmission path between the engine and the electric motor, and a hydraulic power transmission device with a lockup clutch disposed in a power transmission path between the electric motor and drive wheels, characterized in that (b) when the engine is started from motor running using the electric motor, the control device engages the clutch and provides slip control of the lockup clutch, and that (c) if the start of the engine is an engine start caused by a request from a hybrid system, the control device lowers an engagement pressure of the lockup clutch as compared to the case of an engine start caused by an acceleration request from a driver.

Effects of the Invention

Consequently, since if the start of the engine is the engine start caused by a request from the hybrid system, the engagement pressure of the lockup clutch is lowered as compared to the case of the engine start caused by an acceleration request from the driver, the engagement pressure of the lockup clutch is reduced at the time of the engine start caused by a request from the hybrid system associated with the higher sensitivity of the driver to the shock such that a rate of torque transmission by the lockup clutch is made smaller while a rate of torque transmission through fluid of the hydraulic power transmission device is made larger and, therefore, torque variation at the time of engine start can effectively be absorbed by a slip of the fluid during torque transmission so as to reduce the shock.

Preferably, a transmission is further disposed between the hydraulic power transmission device and the drive wheels, and if a gear ratio of the transmission exceeds a predetermined value, the engagement pressure of the lockup clutch is lowered as compared to the case of the gear ratio not exceeding the predetermined value. Consequently, if the gear ratio of the transmission exceeds the predetermined value, when the torque variation generated at the time of engine start is input to an input shaft of the transmission, the torque variation is significantly transmitted to an output side; however, the reduction in the engagement pressure of the lockup clutch in this case allows the hydraulic power transmission device to effectively absorb the torque variation and, therefore, the shock is reduced.

Preferably, the engine start caused by a request from the hybrid system corresponds to the case of starting the engine for electric generation or the case of starting the engine for applying an engine brake. Consequently, the engine start caused by a request from the hybrid system is an engine start not intended by the driver and the driver becomes more sensitive to the shock at the time of engine start. By reducing the engagement pressure of the lockup clutch to increase a rate of the torque transmission through the fluid of the hydraulic power transmission device, the torque variation at the time of engine start can effectively be absorbed by a slip of the fluid during torque transmission so as to reduce the shock.

Preferably, the engine start caused by an acceleration request from the driver corresponds to an engine start when the driver depresses an accelerator pedal. Consequently, when the driver depresses the accelerator pedal, the acceleration request from the driver becomes higher while the sensitivity to shock becomes lower. In such a case, the engagement pressure of the lockup clutch is made higher than the engagement pressure set at the time of the start caused by a request from the hybrid system and, therefore, efficiency of the hydraulic power transmission device can be increased to reduce an uncomfortable feeling attributable to the shortage of drive power.

MODE FOR CARRYING OUT THE INVENTION

Preferably, at the time of engine start, a torque required for an engine start is output from an electric motor in addition to a torque required for motor running. In this way, the shortage of drive power can be prevented during the motor running.

An example of the present invention will now be described in detail with reference to the drawings. In the following example, the figures are simplified or deformed as needed and portions are not necessarily precisely depicted in terms of dimension ratio, shape, etc.

EXAMPLE

Figure 1:
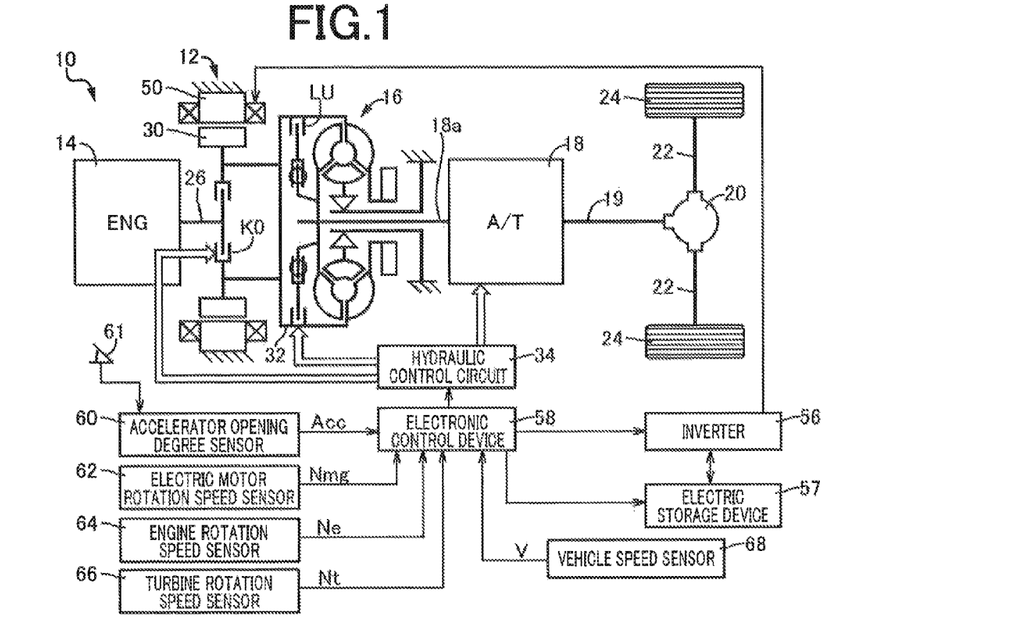
FIG. 1 is a conceptual diagram of a configuration of a drive system and a control system in a hybrid vehicle of an example of the present invention.

FIG. 1 is a conceptual diagram of a configuration of a drive system in a hybrid vehicle 10 of an example of the present invention. As depicted in FIG. 1, the hybrid vehicle 10 includes an electric motor 12 and an engine 14 started by the electric motor 12. A power from the electric motor 12 and the engine 14 is transmitted via a torque converter 16 with a lockup clutch LU, an automatic transmission 18, a propeller shaft 19 (output shaft), a differential gear device 20, and a pair of left and right axles 22 to a pair of left and right drive wheels 24. The hybrid vehicle 10 is driven by one, the other, and both of the electric motor 12 and the engine 14. Therefore, the hybrid vehicle 10 is put into any one running state of motor running (EV running) using only the electric motor 12, engine running using only the engine 14, and hybrid running using the electric motor 12 and the engine 14.

The engine 14 is made up of a cylinder-injection gasoline or diesel engine in which fuel is directly injected into a combustion chamber, and an output member of the engine 14, i.e., a crankshaft 26 is selectively coupled via a clutch K0 to a rotor 30 of the electric motor 12. The rotor 30 of the electric motor 12 is coupled to an input member of the torque converter 16, i.e., a front cover 32. The clutch K0 is a hydraulic friction engagement device and connects/disconnects a power transmission path between the crankshaft 26 and the front cover 32 depending on an oil pressure supplied from a hydraulic control circuit 34. The automatic transmission 18 is made up of a stepped transmission that can be shifted to a plurality of shift stages, for example, and is shifted based on a shift diagram not depicted configured with a vehicle speed V and an accelerator opening degree Acc, for example.

Figure 2:
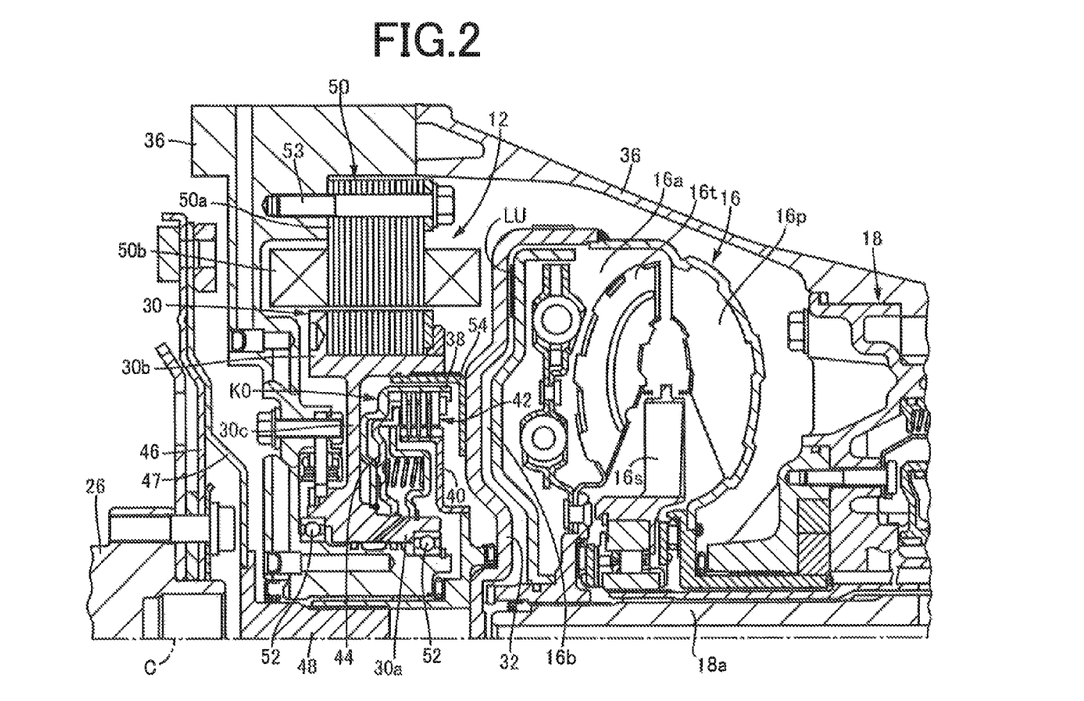
FIG. 2 is a partially cutaway cross-sectional view of an electric motor, a torque converter, an automatic transmission, and a crankshaft of FIG. 1.

FIG. 2 is a partially cutaway cross-sectional view of the electric motor 12, the torque converter 16, the automatic transmission 18, and the crankshaft 26 of FIG. 1. The electric motor 12, the torque converter 16, the automatic transmission 18, and the crankshaft 26 are configured substantially symmetrically relative to an axial center C common thereto and lower halves from the axial center C are not depicted in FIG. 2.

As depicted in FIG. 2, the electric motor 12, the torque converter 16, and the automatic transmission 18 are housed in a transmission case 36. The transmission case 36 is a split-type case made of die-cast aluminum, for example, and is fixed to a vehicle body etc.

The clutch K0 includes a bottomed cylindrical clutch drum 38, a cylindrical clutch hub 40 having a diameter smaller than the clutch drum 38 and disposed concentrically with and relatively rotatably to the clutch drum 38, a friction engagement member 42 disposed in an annular gap between the clutch drum 38 and the clutch hub 40, and a clutch piston 44 pressing the friction engagement member 42 in an axial direction.

The torque converter 16 includes a pump impeller 16$p$ coupled to the engine 14 and the electric motor 12, a turbine impeller 16$t$ coupled to an input shaft 18$a$ of the automatic transmission 18, and a stator impeller 16$s$ coupled via a one-way clutch to the transmission case 36 that is a non-rotating member, and transmits power through fluid.

The lockup clutch LU included in the torque converter 16 is controlled into any one of a release state, a complete engagement state, and a slip engagement state by adjusting a differential pressure $\Delta P$ (=Pin−Pout) between an oil pressure Pin of an engagement-side oil chamber 16$a$ and Pout of a release-side oil chamber 16$b$ of the torque converter 16, i.e., an engagement pressure $\Delta P$ of the lockup clutch LU. For example, if the oil pressure Pin of the engagement-side oil chamber 16$a$ is equal to the oil pressure Pout of the release-side oil chamber 16$b$, the engagement pressure $\Delta P$ is zero and the lockup clutch LU is released. If the engagement pressure $\Delta P$ has a positive value, the lockup clutch LU is put into the slip engagement depending on a level of the value. Specifically, as the engagement pressure $\Delta P$ increases, a slip rotation number Nslip (=Np−Nt) becomes smaller. When the engagement pressure $\Delta P$ has the maximum value, the lockup clutch LU is completely engaged and the front cover 32 and the input shaft 18$a$ of the automatic transmission 18 are directly coupled to each other. Np denotes a pump rotation speed Np of the pump impeller 16$p$ and is equal to an electric motor rotation speed Nmg of the electric motor 12 in this example. Nt denotes a turbine rotation speed Nt of the turbine impeller 16$t$.

The clutch drum 38 is integrally fixed to a boss portion 30$a$ described later in the rotor 30 of the electric motor 12 by welding, for example, and is disposed to be rotatable along with the rotor 30.

The friction engagement member 42 includes a plurality of annular plate-shaped separators engaged relatively non-rotatably with the clutch drum 38, and a plurality of annular plate-shaped friction plates each disposed between the multiple separators and engaged relatively non-rotatably with the clutch hub 40.

In the clutch K0 configured in this way, the friction engagement member 42 is pressed by the clutch piston 44 in the axial direction and the separators and the friction plates are frictionally engaged with each other, thereby suppressing relative rotation between the clutch drum 38 and the clutch hub 40. Therefore, mutual power transmission is enabled between the clutch drum 38 and the clutch hub 40.

The crankshaft 26 has an output end portion, i.e., one end portion closer to the electric motor 12, coupled via each of drive plates 46 and 47 to a rotation shaft 48 coupled to the clutch hub 40 of the clutch K0. Therefore, the crankshaft 26 and the clutch hub 40 are rotatably coupled together via the drive plates 46 and 47 and the rotation shaft 48.

The electric motor 12 includes the rotor 30 supported rotatably around the axial center C by the transmission case 36 on the outer circumferential side of the rotation shaft 48 and a stator 50 integrally fixed to the transmission case 36 on the outer circumferential side of the rotor 30.

The rotor 30 includes the cylindrical boss portion 30a supported rotatably via a pair of bearings 52 by the transmission case 36, a rotor portion 30b having a plurality of annular steel plates stacked in the axial direction with a slight gap from the stator 50 on the inner circumferential side of the stator 50, and a coupling portion 30c integrally coupling the boss portion 30a and the rotor portion 30b. The rotor 30 is coupled to the front cover 32 via a transmitting member 54 coupled to the inner circumferential side of the rotor portion 30b and fixed integrally to the front cover 32 by welding, for example.

The stator 50 includes a core 50a having a plurality of annular steel plates stacked in the axial direction and a plurality of coils 50b wound around a portion in a circumferential direction of an inner circumferential portion of the core 50a and disposed serially in the circumferential direction. The stator 50 is integrally fixed to the transmission case 36 at a plurality of positions in the circumferential direction by a plurality of bolts 53.

The electric motor 12 configured in this way is connected via an inverter 56 of FIG. 1 to an electric storage device 57 such as a battery and a capacitor, and a drive current supplied to the coils 50b is adjusted by controlling the inverter 56, thereby increasing and decreasing an output torque of the electric motor 12. Although the output torque from the electric motor 12 is output only to the torque converter 16 while the clutch K0 is not engaged, a portion of the output torque is output to the torque converter 16 and the other portion is output to the engine 14 while the clutch K0 is engaged.

FIG. 1 is a block diagram for explaining a control system of the hybrid vehicle 10.

In FIG. 1, an electronic control device 58 includes a so-called microcomputer including a CPU, a RAM, a ROM, an input/output interface, etc. The electronic control device 58 causes the CPU to execute signal processes in accordance with programs stored in advance in the ROM while utilizing a temporary storage function of the RAM, thereby providing an output control of the engine 14, a start control of the engine 14, a shift control of the automatic transmission 18, an engagement force control of the clutch K0, etc. The electronic control device 58 functions as a vehicle engine start control device.

The electronic control device 58 is supplied with various input signals detected by sensors disposed on the hybrid vehicle 10. For example, the input signals include a signal indicative of the accelerator opening degree Acc [%] that is a depressed amount of an accelerator pedal 61 detected by an accelerator opening degree sensor 60, a signal indicative of the electric motor rotation speed Nmg [rpm] detected by an electric motor rotation speed sensor 62, a signal indicative of an engine rotation speed Ne [rpm] detected by an engine rotation speed sensor 64, a signal indicative of the turbine rotation speed Nt [rpm] detected by a turbine rotation speed sensor 66, a signal indicative of the vehicle speed V [km/h] corresponding to a rotation speed Nout of the propeller shaft 19 (output shaft) of the automatic transmission 18 detected by a vehicle speed sensor 68, etc.

The electronic control device 58 supplies various output signals to the devices disposed on the hybrid vehicle 10. For example, the output signals include a signal supplied to the inverter 56 for the output control of the electric motor 12, and a signal supplied to the hydraulic control circuit 34 for the engagement force control of the clutch K0, the lockup clutch LU, etc.

Figure 3:
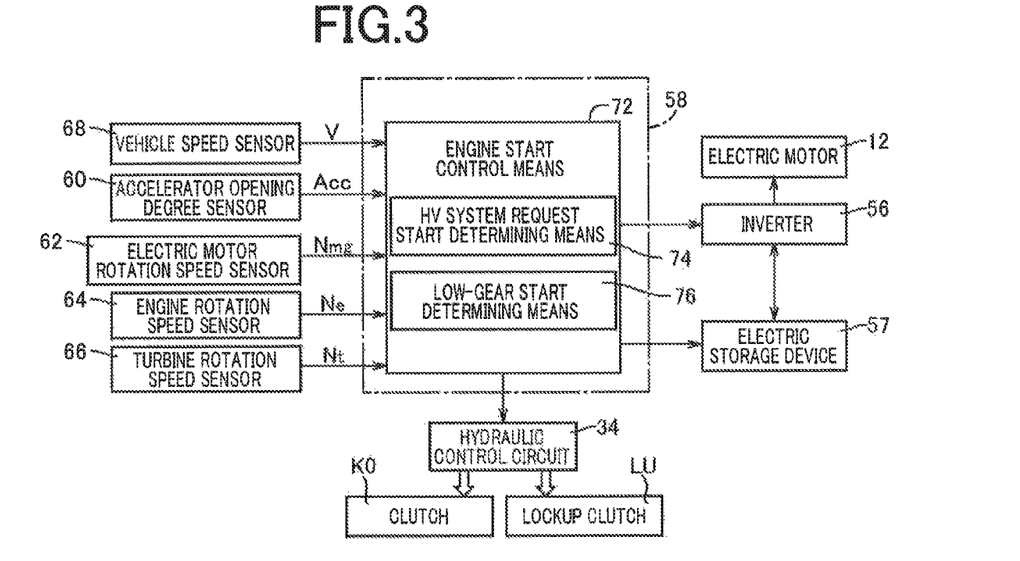
FIG. 3 is a functional block diagram for explaining a main portion of a control function of an electronic control device of FIG. 1.

FIG. 3 is a functional block diagram for explaining a main portion of a control function according to the present invention included in the electronic control device 58. In FIG. 3, when receiving a command for starting the engine 14 from the motor running (EV running) using the electric motor 12, an engine start control means 72 provides an engine start control. Specifically, to start the engine 14 from a motor running state, i.e., the state in which the clutch K0 is released with the lockup clutch LU engaged, the engine start control means 72 starts the control of engaging the clutch K0 and putting the lockup clutch LU into the slip engagement. The engine start control means 72 also outputs a compensating torque required for the engine start in addition to the torque for the motor running This compensating torque is set to a value set in advance depending on a torque capacity of the clutch K0 from the start of the engine start control. The output of the compensating torque prevents a reduction in the torque output toward the drive wheels 24 at the time of engine start.

Figure 4:
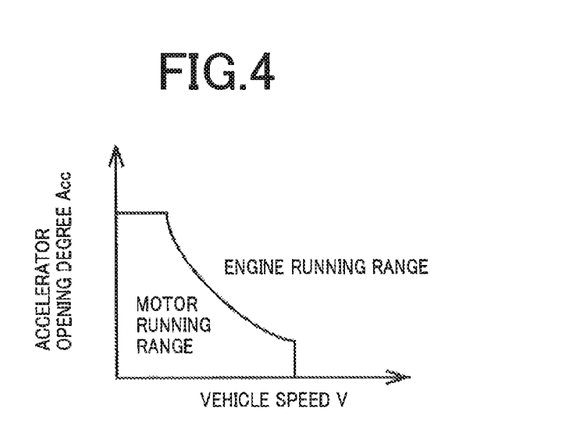
FIG. 4 is a diagram of running modes of the hybrid vehicle.

An HV system request start determining means 74 determines whether the start of the engine 14 is caused by a request from a hybrid system. A specific engine start caused by a request from the hybrid system corresponds to the case of starting the engine for electric generation when a charging capacity SOC of the electric storage device 57 falls below a preset lower limit value, for example. In such a case, even if the running state of the vehicle is within a motor running range depicted in FIG. 4, the engine 14 needs to be started. The engine start also corresponds to the case of substituting the braking using the rotation of the engine 14 for the braking using the electric motor 12, i.e., the case of starting the engine 14 for applying an engine brake, when the charging capacity SOC of the electric storage device 57 exceeds a preset upper limit value during regenerative running using the electric motor 12, for example. Although a self-sustained operation is not performed by the engine 14 in this case, this case is included in the start of the engine 14 because the engine 14 is rotated. The engine start also corresponds to the case that a warming-up by the engine 14 is required. Since the engine start in these cases is not associated with an acceleration request from a driver and is not intended by the driver, the sensitivity to shock is increased. The hybrid system corresponds to a configuration of a control system around the electronic control device 58 controlling the hybrid vehicle 10 and plays a role of allowing the hybrid vehicle 10 to run at low fuel consumption and maintaining the optimum charging capacity SOC of the electric storage device 57, for example.

If the start of the engine 14 is caused by a request from the hybrid system as described above, the HV system request start determining means 74 makes the affirmative determination. The engine start not caused by a request from the hybrid system corresponds to the engine start caused by an acceleration request from a driver. Specifically, the engine start corresponds to the case that the running state of the vehicle is switched from the motor running range to an engine running range depicted in FIG. 4 because the driver depresses the accelerator pedal 61. In such a case, the HV system request start determining means 74 makes the negative determination.

Figure 5:
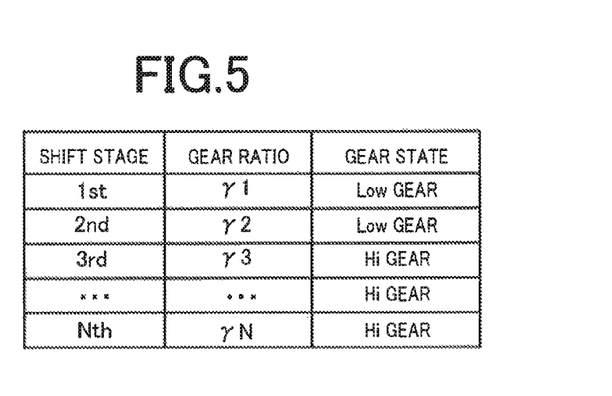
FIG. 5 is a table indicating a Low gear and a Hi gear set for each shift stage of the automatic transmission.

A Low-gear start determining means 76 determines whether the start of the engine 14 is caused by an acceleration request from the driver rather than a request from the hybrid system and whether a current gear ratio of the automatic transmission 18 exceeds a predetermined value $\alpha$. The Low-gear start determining means 76 determines whether the start of the engine 14 is caused by an acceleration request from the driver, based on the accelerator opening degree Acc that is an operation amount of the accelerator pedal 61, for example. Specifically, if the accelerator opening degree Acc is zero, it is determined that the engine start is not caused by an acceleration request from the driver and, if the accelerator opening degree Acc is not zero, it is determined that the engine start is caused by an acceleration request from the driver. If determining that the engine start is caused by an acceleration request from the driver, the Low-gear start determining means 76 determines whether the gear ratio of the automatic transmission 18 exceeds the predetermined value $\alpha$. For example, as depicted in FIG. 5, each shift stage is defined as a Low gear having a gear ratio exceeding the predetermined value $\alpha$ or a Hi gear having a gear ratio not exceeding the predetermined value $\alpha$, and the Low-gear start determining means 76 detects a current shift stage to determine whether the shift stage is a Low gear, based on FIG. 5. In this example, based on FIG. 5, a gear ratio $\gamma 2$ of a second shift stage corresponds to the predetermined value of the present invention. The current shift stage can be detected by referring to a shift command output from the electronic control device 58 to the hydraulic control circuit 34 or a current running state from a shift diagram not depicted.

If the HV system request start determining means 74 determines that the engine start is caused by a request from the hybrid system, the engine start control means 72 increases the slip rotation number Nslip (=Np−Nt) of the lockup clutch LU as compared to the case of the engine start caused by an acceleration request from the driver. In other words, the engagement pressure $\Delta P$ (=Pin−Pout) of the lockup clutch LU is lowered to increase the slip rotation number Nslip. The engagement pressure $\Delta P$ is obtained in advance by experiment etc., and is set to a lower value as compared to the case of the engine start caused by an acceleration request from the driver. Specifically, the engagement pressure $\Delta P$ is set to a level at which the driver hardly feels the shock.

When the engagement pressure $\Delta P$ of the lockup clutch LU is lowered as described above, a rate of torque transmission by the lockup clutch LU is reduced in the torque transmitted to the drive wheels 24 while a rate of torque transmission through fluid of the torque converter 16 is increased. If a rate of the torque transmission through fluid of the torque converter 16 is increased, torque transmission efficiency η of the torque converter 16 is reduced; however, torque variation generated at the time of engine start and transmitted to the torque converter 16 is absorbed by a slip of the fluid of the torque converter 16.

Figure 6:
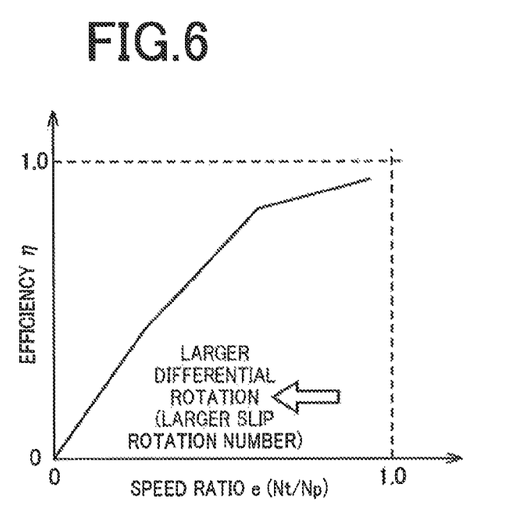
FIG. 6 is a diagram of relationship (torque converter characteristics) between a speed ratio and efficiency (power transmission efficiency) of the torque converter.

FIG. 6 depicts relationship (torque converter characteristics) between a speed ratio e and efficiency η (power transmission efficiency) of the torque converter 16. The speed ratio e is a ratio (=Nt/Np) between the turbine rotation speed Nt and the pump rotation speed Np. In this example, since the pump impeller 16p is directly coupled to the electric motor 12, the pump rotation speed Np is equal to the electric motor rotation speed Nmg. As depicted in FIG. 6, the efficiency η becomes higher as the speed ratio e increases. In other words, the efficiency η becomes higher as the slip rotation number Nslip (=Np−Nt=Nmg−Nt) between the turbine rotation speed Nt and the pump rotation speed Np (=Nmg) decreases. However, when the slip rotation number Nslip is larger, since the rate of the torque transmission through fluid is made larger although the efficiency is reduced, the effect of absorbing torque variation by a slip of the fluid of the torque converter 16 is increased, thereby reducing the shock due to the torque variation transmitted to the output side. Therefore, the engine start control means 72 can reduce the engagement pressure $\Delta P$ of the lockup clutch LU to increase the slip rotation number Nslip, thereby absorbing the shock generated at the time of engine start.

In the case of the engine start not caused by a request from the hybrid system, i.e., the engine start caused by an acceleration request from the driver such as depression of the accelerator pedal 61, if the Low-gear start determining means 76 determines that a current gear ratio of the automatic transmission 18 exceeds the predetermined value $\alpha$ and corresponds to a Low gear, the engine start control means 72 reduces the engagement pressure $\Delta P$ (=Pin−Pout) of the lockup clutch LU to the engagement pressure $\Delta P$ set in advance for Hi gears to increase the slip rotation number Nslip. If the gear ratio of the automatic transmission 18 corresponds to a Low gear, the torque variation transmitted to the output side (the drive wheels 24 side) of the automatic transmission 18 is increased and, therefore, greater shock is transmitted to the driver. In such a case, if the engagement pressure $\Delta P$ of the lockup clutch LU is reduced to increase the slip rotation number Nslip, a rate of the torque transmitted from the lockup clutch LU is reduced while a rate of the torque transmitted through the fluid of the torque converter 16 is increased and, therefore, the shock is effectively absorbed by a slip of the fluid.

In the case of the engine start not caused by a request from the hybrid system, if the gear ratio of the automatic transmission 18 does not correspond to a Low gear, in other words, if the determinations of the HV system request start determining means 74 and the Low-gear start determining means 76 are negative, the engine start control means 72 controls the engagement pressure $\Delta P$ of the lockup clutch LU to a normal value. This normal value is obtained in advance by experiment etc., and is set to an oil pressure higher than the engagement pressure $\Delta P$ at the time of the engine start caused by a request from the hybrid system. For example, if the driver depresses the accelerator pedal 61, the acceleration request from the driver becomes higher while the sensitivity to shock becomes lower. In such case, the engagement pressure $\Delta P$ can be made higher as compared to the engine start caused by a request from the hybrid system so as to increase the efficiency η of the torque converter 16, thereby reducing an uncomfortable feeling attributable to the shortage of drive power. The increased torque transmission efficiency η of the torque converter 16 has almost no effect since the driver is less sensitive to the shock.

Figure 7:
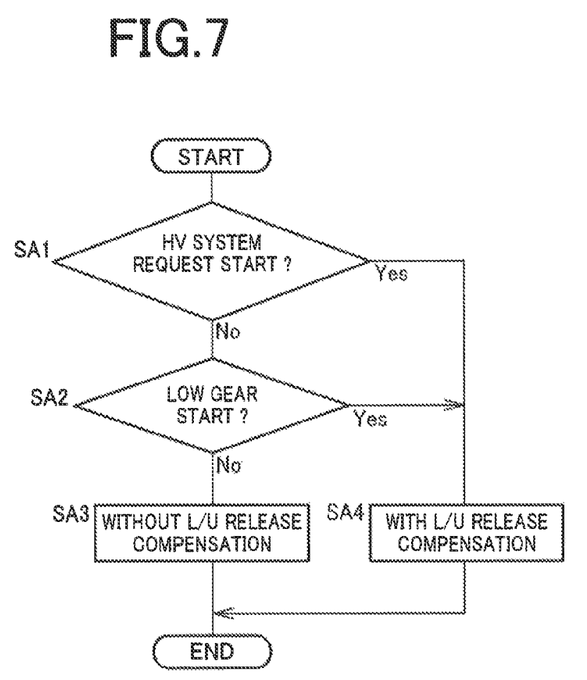
FIG. 7 is a flowchart for explaining a main portion of the control operation of the electronic control device of FIG. 1, i.e., a control operation capable of reducing the shock generated at the time of engine start.

FIG. 7 is a flowchart for explaining a main portion of the control operation of the electronic control device 58, i.e., a control operation capable of reducing the shock generated at the time of engine start during the motor running and is repeatedly executed with an extremely short cycle time, for example, on the order of few msec to a few tens of msec.

First, at SA1 corresponding to the HV system request start determining means 74, it is determined whether an ordered engine start is caused by a request from the hybrid system. If SA1 is negative, at SA2 corresponding to the Low-gear start determining means 76, it is determined whether the ordered engine start is caused by an acceleration request from the driver and whether the current gear ratio of the automatic transmission 18 corresponds to a Low gear. If SA2 is negative, the normal engine start control is provided to control the engagement pressure ΔP of the lockup clutch LU to a predetermined level set in advance. The normal engine start control is the engine start control provided, for example, when the driver depresses the accelerator pedal 61. If SA1 is affirmative or if SA2 is affirmative, at SA4 corresponding to the engine start control means 72, the engine start control is provided with the engagement pressure ΔP of the lockup clutch made lower than the normal engine start control. As a result, since the rate of the torque transmission through the fluid of the torque converter 16 is increased, the torque variation generated at the time of engine start is absorbed by a slip of the fluid and the shock is reduced.

Figure 8A:
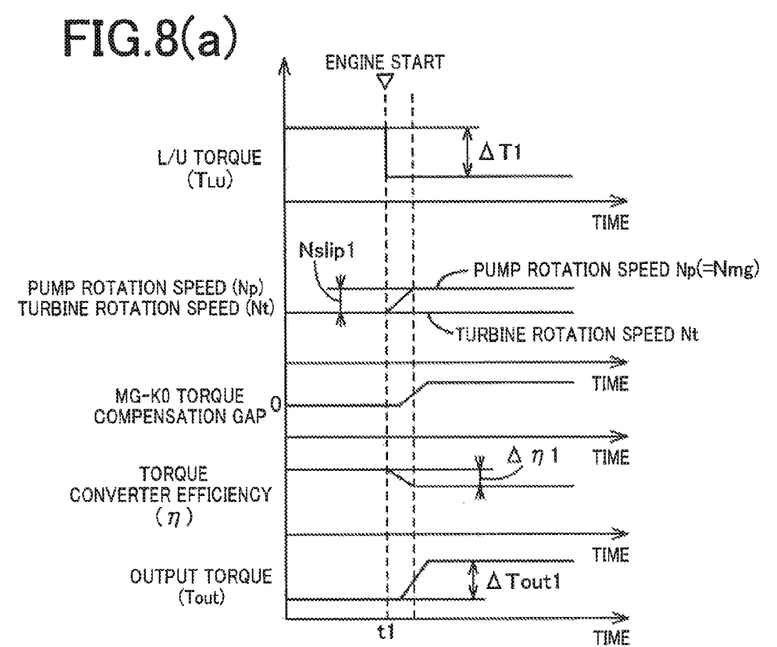
FIG. 8 is a time chart for explaining a control state during the engine start from the motor running
Figure 8B:
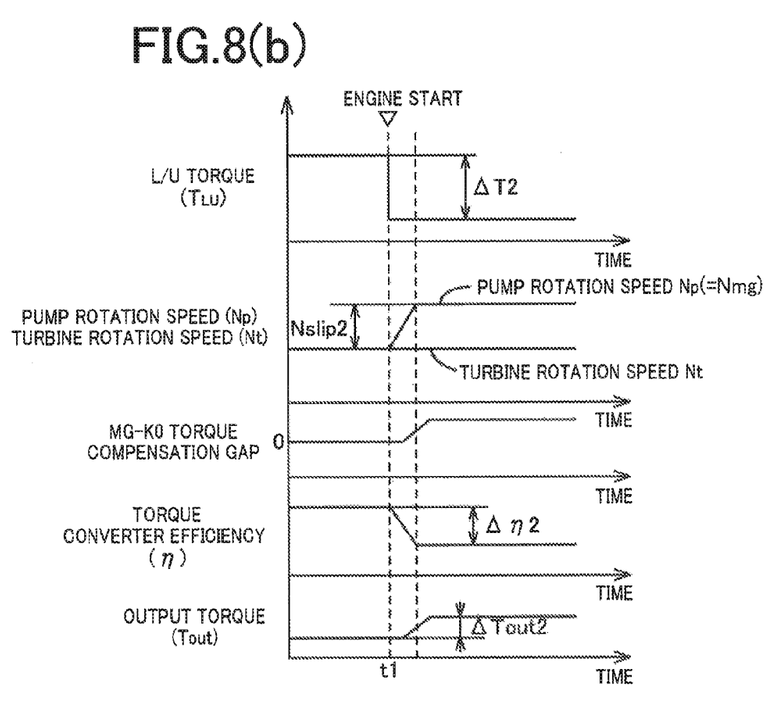

FIG. 8 is a time chart for explaining a control state during the engine start from the motor running FIG. 8(a) depicts a control state at the time of the engine start caused by an acceleration request (such as depression of an accelerator pedal) from the driver, for example, and FIG. 8(b) depicts a control state corresponding to the present invention at the time of the engine start caused by a request from the hybrid system or when the automatic transmission 18 is at a Low gear. FIG. 8(a) also corresponds to the engine start associated with conventional control.

As depicted in FIGS. 8(a) and 8(b), when the engine start is initiated from the motor running at time t1, a lockup torque $T_{LU}$ (transmittable torque) of the lockup clutch LU is reduced. The lockup torque $T_{LU}$ of FIG. 8 is a command value. A transmission torque reduction amount ΔT2 of FIG. 8(b) is larger than a transmission torque reduction amount ΔT1 of FIG. 8(a). In other words, the engagement pressure ΔP of the lockup clutch LU is controlled to a lower value in FIG. 8(b) than FIG. 8(a). As a result, a slip rotation number Nslip2 between the pump rotation speed (impeller rotation speed) Np and the turbine rotation speed Nt of FIG. 8(b) becomes larger than a slip rotation number Nslip1 of FIG. 8(a).

An MG-K0 torque compensation gap depicted in FIGS. 8(a) and 8(b) is a difference (=Tm'-$T_{K0}$) between a torque compensation value Tm' of the electric motor 12 and a transmission torque $T_{K0}$ of the clutch K0 at the time of engine start. The torque compensation value Tm' corresponds to a preset torque required for starting the engine 14 and is a value acquired by subtracting a torque for the motor running from a total torque output from the electric motor 12. Ideally, the transmission torque $T_{K0}$ of the clutch K0 desirably increases at the same timing as the torque compensation value Tm' of the electric motor 12, resulting in the torque compensation gap of zero; however, the torque compensation gap is actually generated due to a delay of an oil pressure of the clutch K0 etc.

In FIG. 8(b), based on the torque converter characteristics depicted in FIG. 6, the speed ratio e becomes smaller as compared to FIG. 8(a) and, therefore, a reduction amount Δη2 of the efficiency η becomes larger than a reduction amount Δη1 of the efficiency η of FIG. 8(a). Thus, the efficiency η is lower in FIG. 8(b) than FIG. 8(a). Contrary to the lower efficiency torque variation is absorbed by a slip of the fluid during the torque transmission through the fluid of the torque converter 16. Therefore, as depicted in FIG. 8(b), a torque change ΔTout2 output from the automatic transmission 18 is smaller than a torque change ΔTout1 of FIG. 8(a).

In other words, this indicates that the shock due to the torque change is made smaller. For example, if the transmission torque $T_{K0}$ of the clutch K0 is set to be rapidly raised at the time of engine start, the climb gradient of the torque compensation value Tm' is accordingly increased in the electric motor 12 and, if an initial rise of the oil pressure of the clutch K0 is delayed in this case, only the torque compensation value Tm' of the electric motor 12 rapidly increases, which deteriorates the shock due to the torque compensation gap. Since the implementation of the engine start control means 72 also allows a slip of the fluid to absorb the torque variation in this situation, the shock is effectively reduced.

As described above, according to this example, since if the start of the engine 14 is the engine start caused by a request from the hybrid system, the engagement pressure ΔP of the lockup clutch LU is lowered as compared to the case of the engine start caused by an acceleration request from the driver, the engagement pressure ΔP of the lockup clutch LU is reduced at the time of the engine start caused by a request from the hybrid system associated with the higher sensitivity of the driver to the shock such that the rate of the torque transmission by the lockup clutch LU is made smaller while the rate of the torque transmission through the fluid of the torque converter 16 is made larger and, therefore, the torque variation at the time of engine start can effectively be absorbed by a slip of the fluid during torque transmission so as to reduce the shock.

According to this example, if the gear ratio γ of the automatic transmission 18 corresponds to a Low gear, when the torque variation generated at the time of engine start is input to the input shaft 18a of the automatic transmission 18, the torque variation is significantly transmitted toward the drive wheels 24; however, the reduction in the engagement pressure ΔP of the lockup clutch LU in this case allows the torque converter 16 to effectively absorb the torque variation and, therefore, the shock is reduced.

According to this example, the engine start caused by a request from the hybrid system corresponds to the case of starting the engine 14 for electric generation or the case of starting the engine 14 for applying an engine brake. As a result, the engine start caused by a request from the hybrid system is an engine start not intended by the driver and the driver becomes more sensitive to the shock at the time of engine start. By reducing the engagement pressure ΔP of the lockup clutch LU to increase the rate of the torque transmission through the fluid of the torque converter 16, the torque variation at the time of engine start can effectively be absorbed by a slip of the fluid during torque transmission so as to reduce the shock.

According to this example, the engine start caused by an acceleration request from the driver corresponds to the engine start when the driver depresses the accelerator pedal 61. As a result, when the driver depresses the accelerator pedal 61, the acceleration request from the driver becomes higher while the sensitivity to shock becomes lower. In such a case, the engagement pressure ΔP of the lockup clutch LU is made higher than the engagement pressure ΔP set at the time of the start caused by a request from the hybrid system and, therefore, the efficiency of the torque converter 16 can be increased to reduce an uncomfortable feeling attributable to the shortage of drive power.

Although the example of the present invention has been described in detail with reference to the drawings, the present invention is also applied in other forms.

For example, although the automatic transmission 18 is disposed in the example, the automatic transmission 18 is not necessarily required for the present invention and the present invention is applicable to a configuration without a transmission.

Although the automatic transmission 18 is a stepped automatic transmission in the example, the present invention can be applicable in the case of a stepless transmission such as a belt type continuously variable transmission. In the case of such a stepless transmission, for example, a gear ratio is set in advance that is a threshold value between a Low gear and a Hi gear, and gear ratios larger and smaller than the gear ratio lead to determinations of a Low gear and a Hi gear, respectively.

Figure 9:
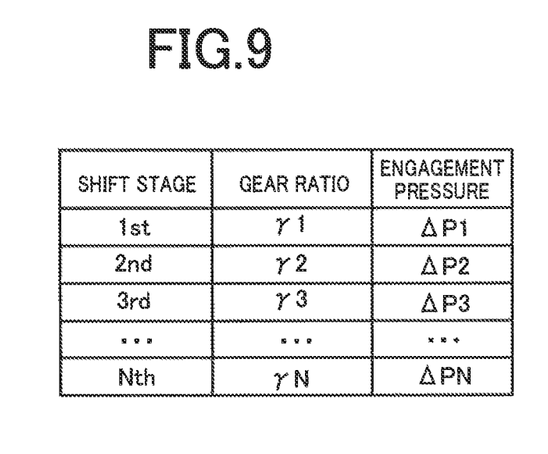
FIG. 9 depicts an example of a relation map of engagement pressure for the shift stages.
Figure 10:
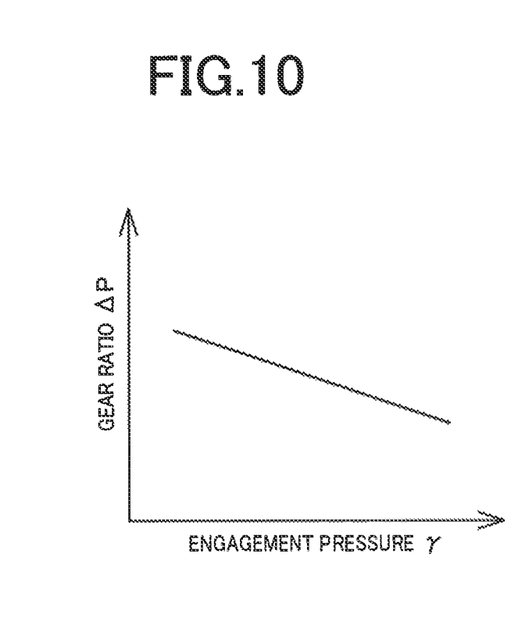
FIG. 10 depicts an example of a relation map of engagement pressure of a lockup clutch for gear ratio.

Although the Low gears and the Hi gears are set in two stages in the example, a relation map of the engagement pressure ΔP for the shift stages as depicted in FIG. 9 may be stored in terms of the engagement pressure ΔP of the lockup clutch LU and the engagement pressure ΔP may be set from the relation map based on the actual shift stage. In this case, the engagement pressure ΔP is set to be smaller as the shift stage becomes higher, i.e., the gear ratio becomes larger. Alternatively, in the case of a gear ratio of a continuously variable transmission, for example, a relation map of the engagement pressure ΔP of the lockup clutch LU for the gear ratio γ as depicted in FIG. 10 may be stored in advance and the actual gear ratio γ may be detected to set the engagement pressure ΔP from the detected gear ratio γ.

Although the torque converter 16 is used as the hydraulic power transmission device in the example, the hydraulic power transmission device is not limited to the torque converter and may be a fluid coupling.

Although the determination of an acceleration request from the driver is made based on an accelerator opening degree in the example, no substantial change is made even if the determination is made based on a throttle valve opening degree since the accelerator opening degree is in one-to-one relationship with the throttle valve opening degree.

The above description is merely an embodiment and the present invention may be implemented in variously modified and improved forms based on the knowledge of those skilled in the art.

NOMENCLATURE OF ELEMENTS

10: hybrid vehicle
12: electric motor
14: engine
16: torque converter (hydraulic power transmission device)
18: automatic transmission (transmission)
24: drive wheels
ΔP: engagement pressure of a lockup clutch
K0: clutch
LU: lockup clutch

The invention claimed is:

1. A control device of a hybrid vehicle having an engine, an electric motor, a clutch disposed in a power transmission path between the engine and the electric motor, and a hydraulic power transmission device with a lockup clutch disposed in a power transmission path between the electric motor and drive wheels,
the control device being configured to:
engage the clutch and control an engagement pressure of the lockup clutch upon starting of the engine in a motor running state in which the hybrid vehicle is driven by the electric motor, and
make the engagement pressure lower when the engine is started by a request from the hybrid vehicle, than when the engine is started by an acceleration request from a driver of the vehicle.

2. The control device of claim 1, wherein:
a transmission is disposed between the hydraulic power transmission device and the drive wheels, and
the control device is further configured to make the engagement pressure lower when a gear ratio of the transmission exceeds a predetermined value, than when the gear ratio does not exceed the predetermined value.

3. The control device of claim 1, wherein the starting of the engine by the request from the hybrid vehicle includes at least one of starting of the engine for electric generation by operation of the engine or starting of the engine for engine brake application by the operation of the engine.

4. The control device of claim 1, wherein the starting of the engine by the acceleration request from the driver of the vehicle includes starting of the engine by depression of an accelerator pedal of the vehicle by the driver of the vehicle.

* * * * *